3,310,542
PROCESS FOR PREPARING POLYMERS OF
DIHYDROPYRAN
Raymond J. Ehrig, Silver Spring, Md., assignor to W. R.
Grace & Co., New York, N.Y., a corporation of
Connecticut
No Drawing. Filed Aug. 19, 1964, Ser. No. 390,733
3 Claims. (Cl. 260—88.3)

This invention relates to a process for polymerizing dihydropyran and to the polymers produced.

Dihydropyran is a heterocyclic ring compound having the following structure:

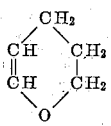

Briefly stated, the present invention comprises contacting dihydropyran with a catalytic amount of a catalyst selected from the group consisting of tin tetrachloride, the reaction product of antimony pentachloride and triphenylmethyl chloride, and the reaction product of titanium trichloride and diethyl aluminum chloride, at a temperature in the range of $-100°$ C. to $100°$ C. to form a polymer of dihydropyran.

The polymerization catalyst of the instant invention is selected from the group consisting of tin tetrachloride, the solid reaction product of antimony pentachloride and triphenylmethyl chloride, and the solid reaction product of titanium trichloride and diethyl aluminum chloride. Each reaction product catalyst is usually formed by admixing solutions or dispersions of the reactants. Substantially equimolar proportions of the reactants are generally used to form each reaction product. The reaction product can be formed prior to the polymerization of the dihydropyran or in situ.

The amount of catalyst used in the instant process is based upon the amount of monomer and may range from about 0.01 to 10.0% by weight of the monomer. Generally, an amount of catalyst in the range from 0.1 to 1.0% by weight of the monomer is satisfactory and preferred.

In carrying out the instant process, the dihydropyran can be polymerized in bulk or in the presence of a diluent. It is preferred to polymerize the dihydropyran in the presence of a diluent for better control of the reaction by maintaining effectively the desired polymerization temperatures. The diluent must be liquid at the temperature of the polymerization reaction. It must also be substantially inert and anhydrous to prevent side reactions. Representative of the diluents which are satisfactory in the present process is propane, butane, pentane, hexane, heptane, octane, toluene and benzene. Generally, the monomer is used in an amount of 10 to 50% by weight of the diluent.

The process of the instant invention should be carried out under substantially anhydrous conditions to avoid side reactions. Any conventional method may be used to provide the desired anhydrous conditions. Usually, carrying out the process under an atmosphere of a substantially dry inert gas such as nitrogen or argon provides satisfactory conditions. The temperature of the polymerization reaction may range from $-100$ to $100°$ C. Generally, temperatures lower than $-100°$ C. will cause the monomer or monomer diluent mixture to solidify and temperature control becomes difficult. On the other hand, temperatures higher than $100°$ C. will produce undesirable side products.

Within the polymerization temperature range of $-100$ to $100°$ C., the particular polymerization temperature used will depend upon the catalyst used and the type of polymer desired. For example, in the presence of tin tetrachloride, the polydihydropyrans produced at polymerization temperatures of about $-78°$ C. have melting points lower than the polydihydropyrans produced at temperatures of about $60°$ C. In the presence of the reaction product of titanium trichloride and diethyl aluminum chloride, the polydihydropyrans produced at polymerization temperatures of about $-78°$ C. are solid polymers with melting points higher than those of the polydihydropyrans produced at temperatures of about $60°$ C. In the presence of the reaction product of antimony pentachloride and triphenylmethyl chloride, the polydihydropyran produced at a polymerization temperature of about $-78°$ C. is a viscous mass, the polydihydropyran produced at room temperatures is a solid, and the polydihydropyran produced at temperatures of about $60°$ C. is an oil.

The pressure of the polymerization reaction may range from 0.1 to 50 atmospheres. Atmospheric pressure however is preferred.

The time required to carry out the polymerization reaction will depend upon the specific reaction conditions.

The polymers of dihydropyran produced according to this invention can be used in a number of applications. For example, the polydihydropyrans which are solids can be molded by conventional techniques to form structures such as film and tubing. The polydihydropyrans which are viscous masses or oils can be used as plasticizers for polymers.

All parts and percentages used herein are by weight unless otherwise indicated.

This invention is further illustrated by the following examples.

Unless otherwise stated, tests in the following examples were made as follows:

The number average molecular weight of the polymer was measured on a Mechrolab Vapor Pressure Osmometer.

The softening and melting points were measured by a Fischer-Johns Melting Point Apparatus.

To determine the structure of the polymer by nuclear magnetic resonance spectroscopy, the polymer was dissolved in carbon tetrachloride to form a solution equivalent to 15 parts by weight of the polymer in 100 cc. of carbon tetrachloride. The solution was then analyzed on a Varian "HR 60 Nuclear Magnetic Resonance Spectrometer" using tetramethylsilane as an internal reference.

The intrinsic viscosity of the polymer was determined at $30°$ C. using a chloroform solution of the polymer.

*Example 1*

Dihydropyran was dried over calcium hydride overnight. It was then refluxed over lithium aluminum hydride for two hours and distilled off. The distilled dihydropyran was degassed by passing a flow of dry argon gas through it for 30 minutes.

Heptane was refluxed over calcium hydride for two hours and distilled off. It was then degassed by passing a flow of dry argon gas through it for 30 minutes.

A 6 ounce pressure tube was dried and degassed with dry argon gas. An atmosphere of dry argon gas was maintained throughout the reaction to provide anhydrous conditions.

0.4 mole (57 ml.) of the dried heptane was added to the pressure tube. The pressure tube was cooled to a temperature of $-78°$ C. by immersing it in a bath comprised of Dry Ice and acetone.

0.2 mole (19.2 ml.) of the dried dihydropyran was added to the tube with mixing.

5 ml. of a 10% heptane solution of tin tetrachloride (0.002 ml.) were added to the tube. The polymerization reaction was allowed to continue with stirring at a temperature of −78° C. for a period of 48 hours. At the end of this time, the reaction mixture was poured into an excess amount of a solution of 50% methanol and 50% water to precipitate the polymer and to deactivate the catalyst.

The precipitated polymer was separated by filtration, washed with methanol and dried in a vacuum oven at room temperature for 24 hours.

The dried polymer was a pale yellow solid. An 85.7% by weight conversion of monomer to polymer was obtained. The polymer softened at a temperature of 90° C. and melted at a temperature of 103° C. The intrinsic viscosity of the polymer was 0.43 dl/gm.

*Example 2*

The procedure used in this example was substantially the same as that disclosed in Example 1 except that the polymerization temperature was 23° C.

The dried polymer was a pale yellow solid. A 76.4% by weight conversion of monomer to polymer was obtained. The polymer softened at a temperature of 95° C. and melted at a temperature of 109° C.

*Example 3*

The procedure used in this example was substantially the same as that disclosed in Example 1 except that the polymerization temperature was 60° C.

The dried polymer was a dark yellow solid. A 43.5% by weight conversion of monomer to polymer was obtained. The polymer softened at a temperature of 100° C. and melted at a temperature of 113° C.

*Example 4*

The procedure used in this example was substantially the same as that disclosed in Example 1.

The catalyst used in this example was the reaction product of titanium trichloride and diethyl aluminum chloride.

This reaction product was formed by adding 0.001 mole (0.15 gm.) of the titanium trichloride to the pressure tube. Ten ml. of the dried heptane were then added to the tube with mixing to form a dispersion of the titanium trichloride. One ml. of a 10% heptane solution of diethyl aluminum chloride (0.001 mole) was added to the dispersion in the tube. 50 ml. of the dried heptane were then added to the tube with mixing.

The pressure tube was cooled to a temperature of −78° C. by immersing it in a bath comprised of Dry Ice and acetone. 0.2 mole (19.2 ml.) of the dried dihydropyran was added to the tube with mixing. The polymerization reaction was allowed to continue with stirring at a temperature of −78° C. for a period of 48 hours.

At the end of this time the reaction mixture was poured into a solution of 50% by weight methanol and 50% by weight water to precipitate the polymer and to deactivate the catalyst. The precipitated polymer was separated by filtration, washed with methanol and dried in a vacuum oven at room temperature for 24 hours.

The dried polymer was a white solid. A 3.8% by weight conversion of monomer to polymer was obtained. The polymer melted at a temperature of 215° C. It was insoluble in chloroform at 30° C.

*Example 5*

The procedure used in this example was substantially the same as that disclosed in Example 4 except that the polymerization temperature was 23° C.

The dried polymer was a white solid. A 17.9% by weight conversion of monomer to polymer was obtained. The polymer melted at a temperature of 175° C. It was insoluble in chloroform at 30° C.

*Example 6*

The procedure used in this example was substantially the same as that disclosed in Example 4 except that the polymerization temperature was 60° C.

The dried polymer was a white solid. A 35.8% by weight conversion of monomer to polymer was obtained. The polymer melted at a temperature of 128° C. It was insoluble in chloroform at 30° C.

*Example 7*

The procedure used in this example was substantially the same as that disclosed in Example 1.

The catalyst used in this example was the reaction product of antimony pentachloride and triphenyl methyl chloride. To prepare the catalyst, carbon tetrachloride was distilled, dried over sodium and degassed with dry argon gas for 15 minutes. Under an atmosphere of dry argon, 0.2 mole (25.6 ml.) of antimony pentachloride was added to 100 ml. of the dried carbon tetrachloride along with 0.2 mole (55.8 grams) of triphenylmethyl chloride. The catalyst component mixture was allowed to react for 3 hours at room temperature. The solid reaction product catalyst precipitated out of solution. It was separated from the solution by filtration, washed with the dried carbon tetrachloride and dried in a vacuum oven at room temperature for 48 hours. Analysis of a portion of the reaction product catalyst showed it to be comprised of 34.74% chlorine, 38.17% carbon and 2.60% hydrogen.

0.0589 gram (0.0001 mole) of the catalyst was added to the reaction pressure tube. 57 ml. of the dried heptane were then added to the tube with mixing. The tube was cooled to a temperature of −78° C. by immersing it in a bath comprised of Dry Ice and acetone. 0.2 mole (19.2 ml.) of the dried dihydropyran was added to the tube with mixing. The polymerization reaction was allowed to continue with stirring at a temperature of −78° C. for a period of 48 hours.

At the end of this time, the reaction mixture was poured into a solution of 50% methanol and 50% water to precipitate the polymer and to deactivate the catalyst. The polymer separated out as a viscous mass. It was separated from the solution, washed with methanol and dried in a vacuum oven at room temperature for 24 hours.

The dried polymer was a viscous mass. A 17.8% by weight conversion of monomer to polymer was obtained.

*Example 8*

The procedure used in this example was substantially the same as that described in Example 7 except that the polymerization temperature was 23° C.

The dried polymer was a pale yellow solid. A 68.7% by weight conversion of monomer to polymer was obtained. The polymer melted at a temperature of 131° C.

*Example 9*

The procedure used in this example was substantially the same as that disclosed in Example 7 except that the polymerization temperature was 60° C.

The dried polymer was an oil. A 79.5% by weight conversion of monomer to polymer was obtained.

*Example 10*

Dihydropyran was dried and degassed substantially as described in Example 1.

The catalyst used in this example was the reaction product of antimony pentachloride and triphenyl methyl chloride. It was prepared substantially as disclosed in Example 7.

0.0589 gram of the antimony pentachloride-triphenylmethyl chloride catalyst was added to a 6 ounce pressure tube under an atmosphere of dry argon. The tube had been predried and degassed with dry argon. A dry argon atmosphere was maintained throughout the polymerization reaction.

0.2 mole (19.2 ml.) of the dried dihydropyran was syringed into the tube.

The polymerization reaction was allowed to continue with stirring at room temperature for a period of 72 hours. At the end of this time, the reaction mixture was poured into excess methanol to precipitate the polymer and to deactivate the catalyst. The precipitated polymer was separated by filtration, washed with methanol and dried in a vacuum oven at room temperature for 24 hours.

The dried polymer weighed 5.5 grams which was determined to be a 33% by weight conversion of monomer to polymer. The polymer was a yellow solid which had a softening point of 137° C., a melting point of 153° C., and a number of average molecular weight of 2200. It was soluble in chloroform and toluene at room temperature.

The polymer was subjected to infrared analysis on a Perkin-Elmer Spectrometer, model 221. The infrared spectrum showed absorption bands at 1650 cm.$^{-1}$ (—C=C—), 1250 cm.$^{-1}$ (—C=C—O—C—) and 1175 cm.$^{-1}$ (—C—O—C—).

Analysis of the polymer by nuclear magnetic resonance spectroscopy showed the following possible structures:

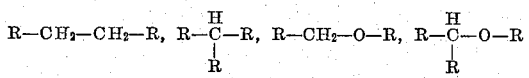

To determine the composition of the polymer, it was analyzed for carbon, hydrogen and oxygen. The polymer sample was dried for 24 hours in vacuo over phosphorus pentoxide before analysis. The results are listed below:

Calculated: C, 71.4; H, 9.5; O, 19.1. Found: C, 71.4; H, 8.9; O, 19.7.

The polymer was analyzed to determine the extent of unsaturation by a standard method, i.e., bromination of the polymer and determination of the amount of bromine consumed (Analytical Chemistry, 112, 385–400 (1938)). This method indicated a polymer unsaturation of 32.4% by weight.

The results indicate that the polymer contains internal unsaturation and that the polymer is a linear chain structure and a cyclic structure which may be a physical mixture or a copolymer such as the following:

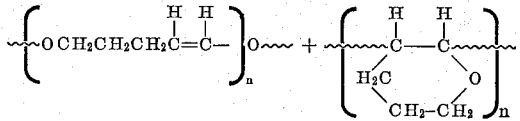

or

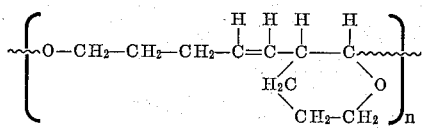

Example 11

2 grams of the solid polydihydropyran prepared in Example 10 were placed in a platen press and pressed at 575° F. at a pressure of 30,000 p.s.i. for 3 minutes. The resulting film was brittle.

Example 12

The film-forming properties of the solid polymers prepared in Examples 1–6 and 8 and 10 were determined.

Each polymer was dissolved in carbon tetrachloride at room temperature to form a 10 percent solution. The resulting solution was coated on a clean smooth glass surface and allowed to dry at room temperature.

The characteristics of the resulting film on the glass surface and of the film stripped from the glass surface are shown in the following table.

| Example disclosing preparation of polymer | Characteristics of film deposited on glass surface | Characteristics of film stripped from glass surface |
| --- | --- | --- |
| 1 | Continuous film formed. Good adherence to surface. | Brittle. |
| 2 | do | Do. |
| 3 | do | Do. |
| 4 | do | Do. |
| 5 | do | Do. |
| 6 | do | Do. |
| 8 | do | Do. |
| 10 | do | Do. |

What is claimed is:

1. A process for polymerizing dihydropyran which comprises contacting dihydropyran under substantially anhydrous conditions with 0.01 to 10.0% by weight of the dihydropyran of the reaction product of antimony pentachloride and triphenylmethyl chloride, said reaction product being formed from substantially equimolar proportions of antimony pentachloride and triphenylmethyl chloride, at a temperature of about −78° C. to 60° C. to form a polymer of dihydropyran.

2. A process according to claim 1 wherein the temperature is about room temperature.

3. A process according to claim 1 wherein the dihydropyran is polymerized in the presence of a diluent which is liquid under polymerization conditions.

References Cited by the Examiner

FOREIGN PATENTS 120,122    7/1945    Australia.
558,106    12/1943    Great Britain.

OTHER REFERENCES

Topchiev et al.: Chem. Abs., 55 (1961), p. 25345e.
Sapozhnikova et al.: Chem. Abs., 59 (1963), p. 15389a.

JOSEPH L. SCHOFER, *Primary Examiner.*

H. WONG, JR., *Assistant Examiner.*